United States Patent [19]
Brasse et al.

[11] Patent Number: 4,861,317
[45] Date of Patent: Aug. 29, 1989

[54] SPEED CHANGER PULLEY

[75] Inventors: Jean-Jacques Brasse, Montigny-les-Cormeilles; Ciriaco Bonfilio, Clichy, both of France

[73] Assignee: Valeo, Paris, France

[21] Appl. No.: 222,777

[22] Filed: Jul. 22, 1988

[30] Foreign Application Priority Data

Jul. 23, 1987 [FR] France ................................ 87 10466

[51] Int. Cl.⁴ .............................................. F16H 55/14
[52] U.S. Cl. ......................................... 474/11; 474/94
[58] Field of Search .................................... 474/11–14, 474/17, 28, 69, 70, 8, 94

[56] References Cited

U.S. PATENT DOCUMENTS 4,559,026 12/1985 Pitoiset ................................... 474/14
4,573,948 3/1986 Thirion de Briel ................... 474/28

FOREIGN PATENT DOCUMENTS 0050920 5/1982 European Pat. Off. .
2516622 11/1981 France .
2557661 7/1985 France .
0181823 5/1986 France ................................. 474/13
2109490 6/1983 United Kingdom .
2140106 11/1984 United Kingdom .

Primary Examiner—Thuy M. Bui
Attorney, Agent, or Firm—Charles E. Brown; Charles A. Brown

[57] ABSTRACT

A speed changer pulley comprises two annular flanges one of which is movable axially on a hub under the control of elastic return member constituted by at least one diaphragm encased with a covering of resilient material. The peripheral part of the diaphragm is prolonged radially outwardly by a rim of resilient material fitted into a housing in the movable flange.

6 Claims, 1 Drawing Sheet

SPEED CHANGER PULLEY

BACKGROUND OF THE INVENTION

The present invention relates generally to speed changers of the kind comprising two pulleys, driving and driven respectively, each of which comprises a hub and two annular flanges facing each other around the said hub to receive a belt, one of the flanges being axially movable relative to the hub and being subjected to annular elastic means which urge it continuously towards the other flange, which is fixed, these elastic means bearing against the movable flange and an integral bearing piece of the hub.

For controlling the configuration of the assembly and thus the transmission ratio, the movable flange of at least one of the pulleys is subject to the action of elastic return means which urge it continuously towards the fixed flange, and which comprise an annular piece with a variably conical shape known as a diaphragm, which through a peripheral part forming a Belleville washer, bears axially indirectly on the movable flange and which, through a central part divided into radial fingers, bears indirectly on the axially permanently fixed bearing piece of the hub.

Such a speed changer is described in U.S. Pat. No. 4,559,026.

In this document a bridging element is permanently fixed to the diaphragm by being glued or fastened thereto and is permanently fixed to the movable flange either directly by being glued or fastened to the flange, or by means of a connecting piece glued or fastened to the bridging element and fixed to the movable flange by clamping with lugs, by clipping, by riveting or by soldering.

The bridging element interposed in this way between the diaphragm and the movable flange and its method of assembly present disadvantages.

Among these disadvantages must be mentioned an increased axial space requirement resulting from the bridging element and the operations of fastening or glueing, with or without a bridging element, which are lengthy and delicate and consequently have a relatively high cost. In addition, if the attachment of the bridging element to the movable flange is effected by lugs, clips or rivets it is necessary also to provide sealing joints in the case of a speed changer controlled by a pressurised fluid.

The invention reduces these disadvantages whilst providing reliable connection between the diaphragm and the movable flange to ensure a good transmission of torque.

SUMMARY

The invention proposes a pulley of a speed changer of the kind comprising a hub and, disposed opposite each other around the hub, two annular flanges one of which is mounted to be axially movable relative to the hub under the control of elastic return means constituted by at least one annular element, such as a diaphragm presenting, on the one hand, a peripheral part forming a Belleville washer which bears axially for rocking against the movable flange and, on the other hand, a central part divided by gaps into radial fingers, which rocks axially against a bearing piece, characterized in that the peripheral part of the diaphragm forming a Belleville washer is prolonged radially outwards by an annular deformable rim made of resilient material received in a housing formed in the movable flange.

According to one embodiment of the invention, the diaphragm is completely encased with a resilient material, the aforementioned rim being formed during the operation of covering the diaphragm.

According to another embodiment, the housing made in the movable flange is constituted by two successive folds turned towards the diaphragm and located at the periphery of the movable flange.

According to another variant, the housing is made by a metal ring disposed around the ends of the rim and the movable flange, the two ends of which are turned down inwardly to ensure an axial clamping between the rim and the flange.

These different arrangements result in various advantages, especially through a reduction in the axial space requirement of the assembly, through a simplification of assembling and through an improvement in sealing in the case of a speed changer controlled by a pressurised fluid.

DESCRIPTION OF THE PREFERRED EMBODIMENTS

Figure 1:
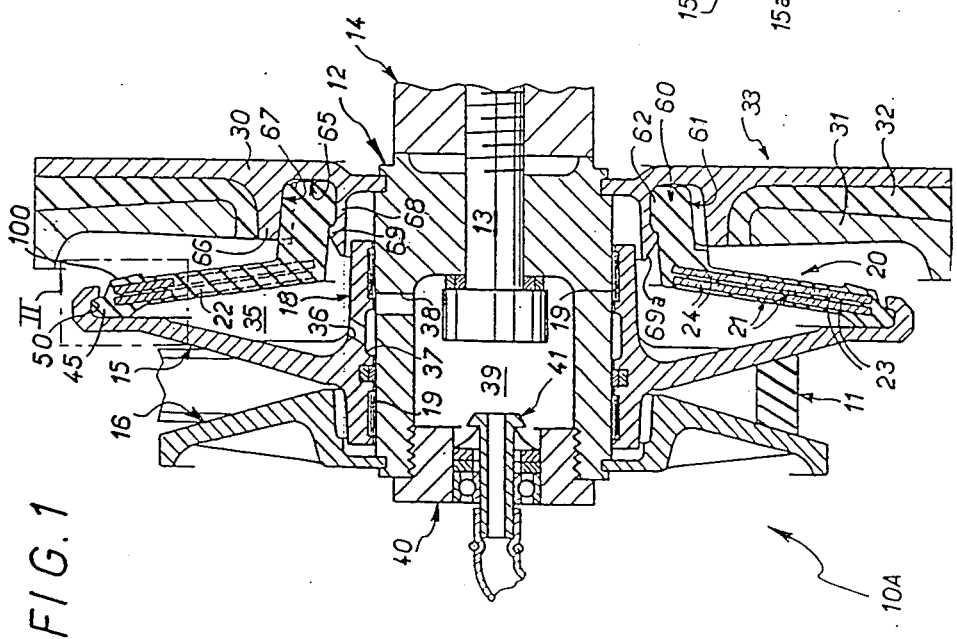
FIG. 1 is a view in axial section of a speed changer pulley according to the invention.

In FIG. 1 a speed changer pulley similar to the kind described in the Patent mentioned previously is shown. In practice this is the driving pulley 10A.

Driving pulley 10A comprises a hub 12 which is connected by a screw 13 at the end of a driving shaft 14 and is thus fixed in rotation to the latter. Around the hub 12 are mounted two annular flanges 15 and 16 with frustoconical flanks facing one another to receive a belt 11, and at least one of which (in practice flange 15) is mounted to be axially movable relative to hub 12. The flange 16, or fixed flange, is permanently fastened both axially and circumferentially to hub 12, for example by crimping.

In order to move axially on hub 12 the movable flange 15 terminates at its inner periphery in an axial connector 18 which extends on both sides of flange 15. This connector 18 is slidingly engaged on hub 12 with the interposition of sliding races 19.

Flange 15 is continuously urged towards flange 16 by axially acting elastic return means 20.

In this case these means 20 are constituted by two generally annular pieces 21, disposed parallel to one another and separated from one another. These two pieces 21 consist of two diaphragms encased with a resilient material 22, such as an elastomer. This covering 22 is permanently fixed to the diaphragms 21 by glueing or by adhesion resulting from vulcanization.

Each diaphragm 21 comprises a circularly continuous peripheral part 23 forming a Belleville washer and a central Part 24 divided into radial fingers by gaps 25.

These diaphragms 21 and the covering 22 constitute a unitary resilient assembly with a variably conical shape which, through the peripheral parts 23 bears for axial rocking movement against the movable flange 15 and which through the central parts 24 bears for axial rocking movement against a bearing piece 30.

This piece 30 is constituted by a flange permanently fixed axially in rotation to hub 12, being for example crimped for this purpose by its inner periphery on the end of the latter furthest from flange 16. This flange 30 carries an annular mass 31 forming an inertia ring, with a damping element 32 made of resilient material confined between flange 30 and ring 31. This element 32 is for example glued or fixed to ring 31 and flange 30 the assembly constituting a damper 33 to filter out the vibrations which arise along the kinematic chain in which the speed changer is interposed.

A control chamber 35 is defined between flange 15, hub 12 and the assembly constituted by the elastic means 20 and the bearing piece 30. This chamber 35 is connected to a source of fluid (not shown) and in particular to a source of pneumatic fluid under pressure or at reduced pressure. For this purpose at least one radial orifice 36 is machined in the connector 18 and opens into an annular groove 37, with a rectangular shape in the axial direction, provided on the inner periphery of connector 18. This groove 37 is in permanent communication, through a radial channel 38 machined in hub 12, with an internal hollow space in the latter. This hollow space 39, in the end of hub 12 furthest away from the drive shaft 14, is closed so that it is sealed by a plug 40 equipped with a connector 41 which connects the hollow space 39 with the source of fluid.

In accordance with an important characteristic of the invention (FIG. 2) the covering 22 of resilient material is prolonged radially outwards beyond the circular parts 23 of the diaphragms 21, to form a rim 45. This radial rim 45 is axially off-set relative to the diaphragms and connects with the covering 22 through two annular sloping faces, the inner face 46 and outer face 47 respectively. The axial off-set of the rim disengages the diaphragms 21 from the movable flange 15 which enables them to be freely deformed during movement of the flange.

The rim 45 is fitted into a housing 50 made in the movable flange 15 so as to constitute a rocking bearing for the diaphragms 21 and to fix them at least axially to flange 15.

Figure 2:
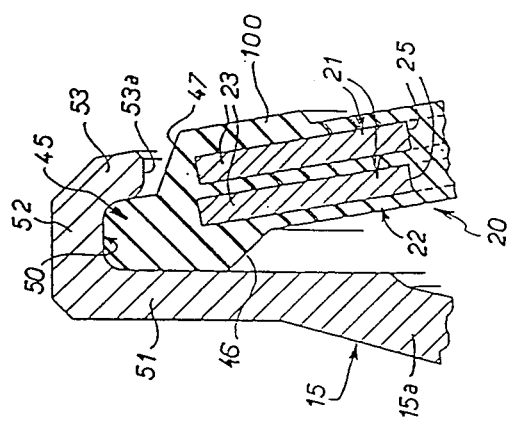
FIG. 2 repeats, on a larger scale, the detail of FIG. 1 indicated by an insert II on this.

According to a first embodiment shown in FIG. 2, the central sloped part 15a of flange 15 is prolonged outwardly by an annular radial part 51 which terminates in two successive folds substantially at 90°, to form respectively an axial flange 52 and a radial flange 53 directed inwards. The inner peripheral surfaces of these two flanges 52, 53 delimit the housing 50. It should be noted that the outer face 47 allows the rim 45 to disengage from the adjacent end 53a of the radial flange 53 thus allowing a tool to be passed in to fit the rim 45 in, as will be described later.

Referring again to FIG. 1, the covering 22 is prolonged at its inner periphery by an annular axial bridging element 60 which extends towards the bearing piece 30. Towards its terminal part, the bridging element 60 presents an undulating profile forming undulations 61 with an axial orientation on its outer periphery and an annular boss 62 on its inner periphery. The bridging element 60 is fitted into a housing 65 in the adjacent face of the bearing piece 30. For this purpose flange 30 comprises an axial ring 66, coaxial with hub 12, with undulations 67 having a shape complementary to that of undulations 61 and obtained by stamping, for example. Lugs 68 projecting axially from flange 30 are regularly distributed on a circumference coaxially inside ring 66.

Each lug 68 comprises, on the same side as the housing 65, and towards its terminal extremity, a boss 69 prolonged by a sloping face 69a. The housing 65 is thus defined by the annular space delimited between ring 66 and the lugs 68.

It should be noted that sufficient space is provided between the lugs 68 and hub 12 to enable free passage of the connecting piece 18 of the movable flange 15 during its displacement towards its position of maximum separation relative to the fixed flange 16.

Assembly of the pulley 10A is effected as follows.

The flange 16 is connected and fixed, by crimping for example, on the hub 12, at the end of the hub and on the side away from the drive shaft 14. The movable flange 15 is mounted, so that it can slide, around the hub 12 on sliding races 19. The unitary resilient assembly 20 is connected around the hub 12 and, with the aid of a tool (not shown) which bears on the end 53a, the rim 45 is deformed to be completely fitted into the housing 50. The damper 33 is then connected around the hub 12 with the forced fitting in of the bridging element 60 in the housing 65 of the flange. As a result of the resilience of the lugs 68 and of the bridging element 60 this passes into the interior of the housing 65 with its undulations 61 nesting in the undulations 67 and its internal boss 62 bearing on bosses 69. It should be noted that once the bridging element 60 is in abutment against the flange 30 at the bottom of the housing 65, the deformation of the bridging element 60 entrains a compression of its internal boss 62, which comes into contact with the lugs 68 along the entire length of these. Through the nesting of the undulations 61, 67, the bridging element 60 is fixed in rotation to the flange 30. Finally, the flange 30 is fixed to the hub 12, by the crimping for example.

Figure 3:
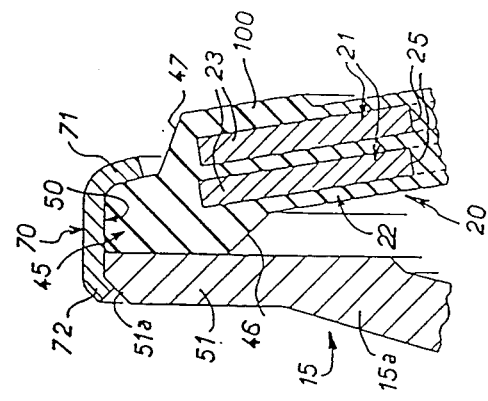
FIG. 3 is a similar view to FIG. 2 but for another embodiment of the invention.

According to the variant in FIG. 3, the housing 50 is delimited by means of a ring 70 connected around the ends of the movable flange 15 and the rim 45. Towards its two extremities, the ring 70 is bent radially inwards to ensure an axial clamping between the movable flange 15 and the rim 45. During assembly, the rim 45 is put into contact with the terminal radial part 51 of the flange 15 in such a way that their terminal extremities become substantially flush with one another. The ring 70, one extremity of which has previously been bent inwards to form a flange 71, by stamping for example, is connected around the rim 45 in such a way that the inner face of the flange 71 of the ring 70 comes to bear against the face of the rim opposite to that in contact with the movable flange 15. Finally, the other extremity of the ring 70 is bent inwards to form a flange 72 obtained by a rolling operation for example, the flange 72 advantageously coming in contact with a chamfer 51a formed on the extremity of the movable flange 15 on its face opposite to that in contact with the rim 45.

Of course, the rim 45 in the axial direction and the bridging element 60 in the radial direction must present transverse cross-sections of greater dimensions than those of the respective housings 50, 65 to be able to be assembled by fitting into these parts. Finally, it should be noted that the elastic return means 20 are fixed to the movable flange 15 and the bearing piece 30, exercising a pressure which permits retention of the rim 45 and the bridging element 60 fitted in to their respective housings 50, 65. This pressure is exercised especially after the fixing of the flange 30 on the hub 12.

In a general way, to limit the separation between the flanges 15, 16 of the driving pulley 10A and to prevent the belt 11 coming out of the pulley, a stop is provided between the movable flange 15 and the bearing piece 30 to limit the extent of movement.

This stop is advantageously fixed to the elastic return means 20 and is formed by an annular boss 100 of resilient material extending annularly towards the bearing piece 30. In this example, the boss 100 is constituted by the covering 22 at the level of the circular part 23 of the diaphragms 21, and comes to bear against the adjacent wall of the inertia ring 31 of the damper 33. The stop is thus carried by the covering 22 forming a projection on the latter.

In the embodiments described above, the lugs 68 may be replaced by a continuous ring comprising a boss to retain the bridging element 60 axially, once this is introduced into the housing 65.

Alternatively, if the speed changer is not associated with a damper 33, it is sufficient that the bearing piece 30 extends radially to a length sufficient to cooperate with the stop 100.

The invention is not limited in its application to the embodiments described above and it applies equally well to a driving pulley as to a driven pulley. The speed changer can be of the controlled kind, as described above, or of the centrifugal kind.

What is claimed is:

1. A speed changer pulley of the kind comprising a hub and two annular flanges disposed opposite each other around said hub, one of said flanges being axially movable relative to said hub under the control of elastic return means constituted by at least one annular element comprising a diaphragm presenting, on the one hand, a circular peripheral part forming a Belleville washer which bears axially to rock against the movable flange by means of a covering of resilient material which encases the circular peripheral part and, on the other hand, a central part divided by gaps into radial fingers, which rocks against a bearing piece, wherein said covering of resilient material is prolonged radially outwards beyond the circular peripheral part of the diapragm by an annular deformable rim made of resilinet material fitted in a housing formed in the movable flange and axially off-set relative to the diaphragm which is disposed outwards said housing so as to constitute a rocking bearing for the diaphragm and to fix them at least axially to said axially movable flange.

2. A pulley according to claim 1, wherein the radial rim is connected to the covering through two annular sloping faces, one inner face and one outer face, extending respectively towards said axially movable flange and said bearing piece.

3. A pulley according to claim 1, wherein said outer face of the rim is connected to a projecting annular boss of the covering extending annularly towards the bearing piece to form a stop adapted to limit the separation between the flanges.

4. A pulley according to claim 1, wherein said axially movable flange has a central sloped part which is prolonged outwardly by an annular radial part which terminates in two successive folds substantially at 90 degrees, to form respectively an axial flange and a radial flange directed inwardly and to form said housing.

5. A pulley according to claim 1, wherein said axially movable flange has a central sloped part which is prolonged outwardly by annular radial part and said housing is formed by a ring connected to said annular radial part, the two extremities of said ring being bent inwardly to keep said rim squeezed axially against said axially movable flange.

6. A pulley according to claim 1, wherein said elastic return means are constituted by two diaphragms disposed parallel to one another and separated from one another by said covering which encase the diaphragms.

* * * * *